United States Patent [19]

Prostler

[11] Patent Number: 5,142,813
[45] Date of Patent: Sep. 1, 1992

[54] MOUSE TRAP APPARATUS

[76] Inventor: Richard A. Prostler, Box 473, Claverack, N.Y. 12513

[21] Appl. No.: 723,767

[22] Filed: Jul. 1, 1991

[51] Int. Cl.⁵ ............................................. A01M 23/30
[52] U.S. Cl. ........................................................ 43/81
[58] Field of Search .............................. 43/81, 81.5, 82

[56] References Cited

U.S. PATENT DOCUMENTS

| | | | |
|---|---|---|---|
| 1,342,255 | 6/1920 | Doust | 43/81 |
| 2,517,928 | 9/1950 | Richards | 43/81 |
| 2,544,475 | 3/1951 | Uttz | 43/81 |
| 2,640,293 | 6/1953 | Cook | 43/81 |

Primary Examiner—Richard K. Seidel
Assistant Examiner—Jeanne M. Elpel
Attorney, Agent, or Firm—Leon Gilden

[57] ABSTRACT

An apparatus including a support plate, with the support plate including a first pivot axle mounting a first plate thereon. The first plate includes a first end mounting a support plate, the second end is positioned in abutment with a second plate in a longitudinally aligned orientation relative to the second plate when the second plate and first plate are in a first position. When in the first position, the second plate is positioned over a second loop, with a first loop oriented orthogonally relative to the top surface of the support plate. Upon a rodent disrupting the bait support plate, the first plate is displaced relative to the second plate releasing the first loop for a step action acceleration onto the bait plate floor for impact therewith to trap or kill the rodent thereon.

1 Claim, 4 Drawing Sheets

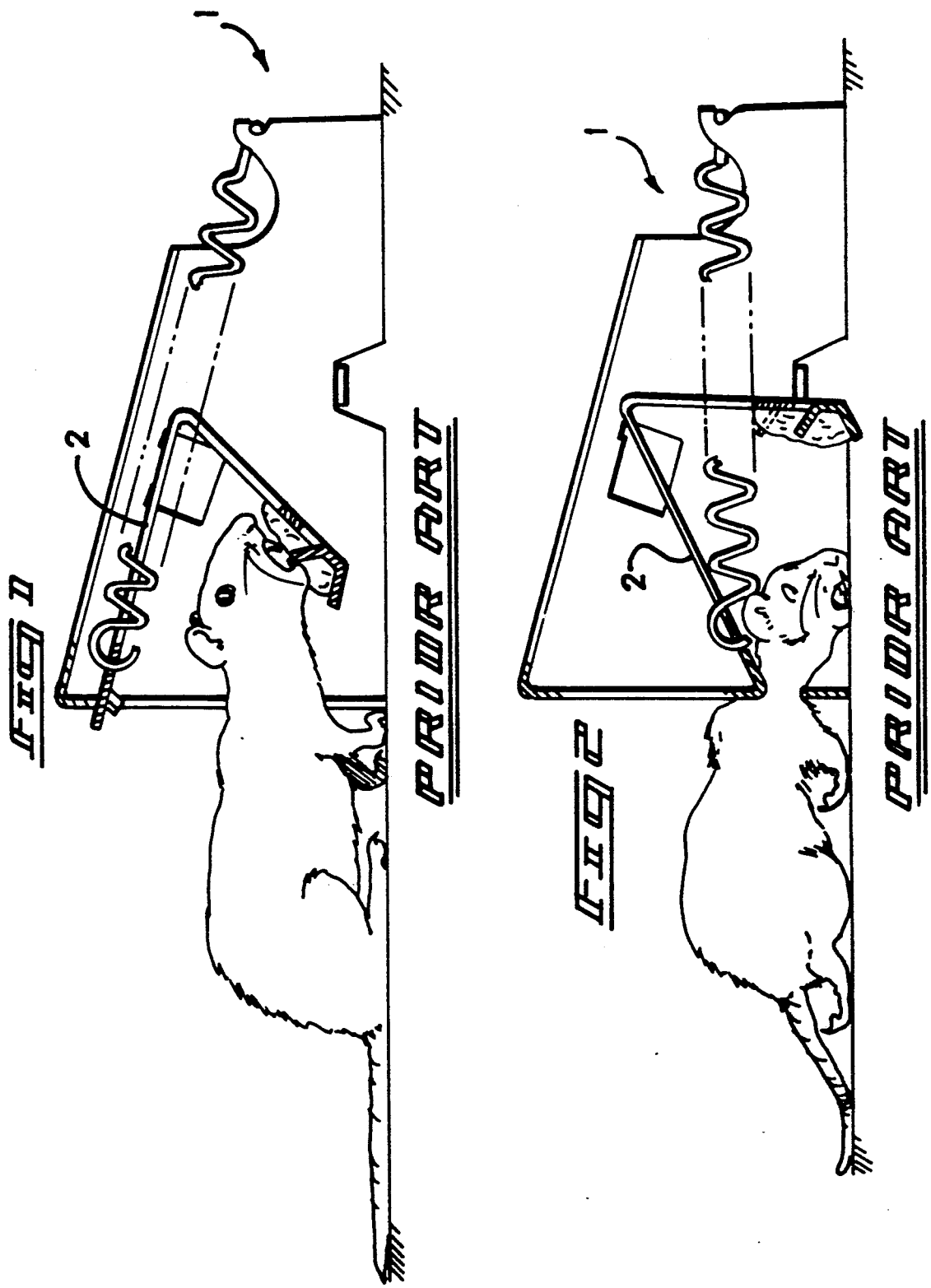

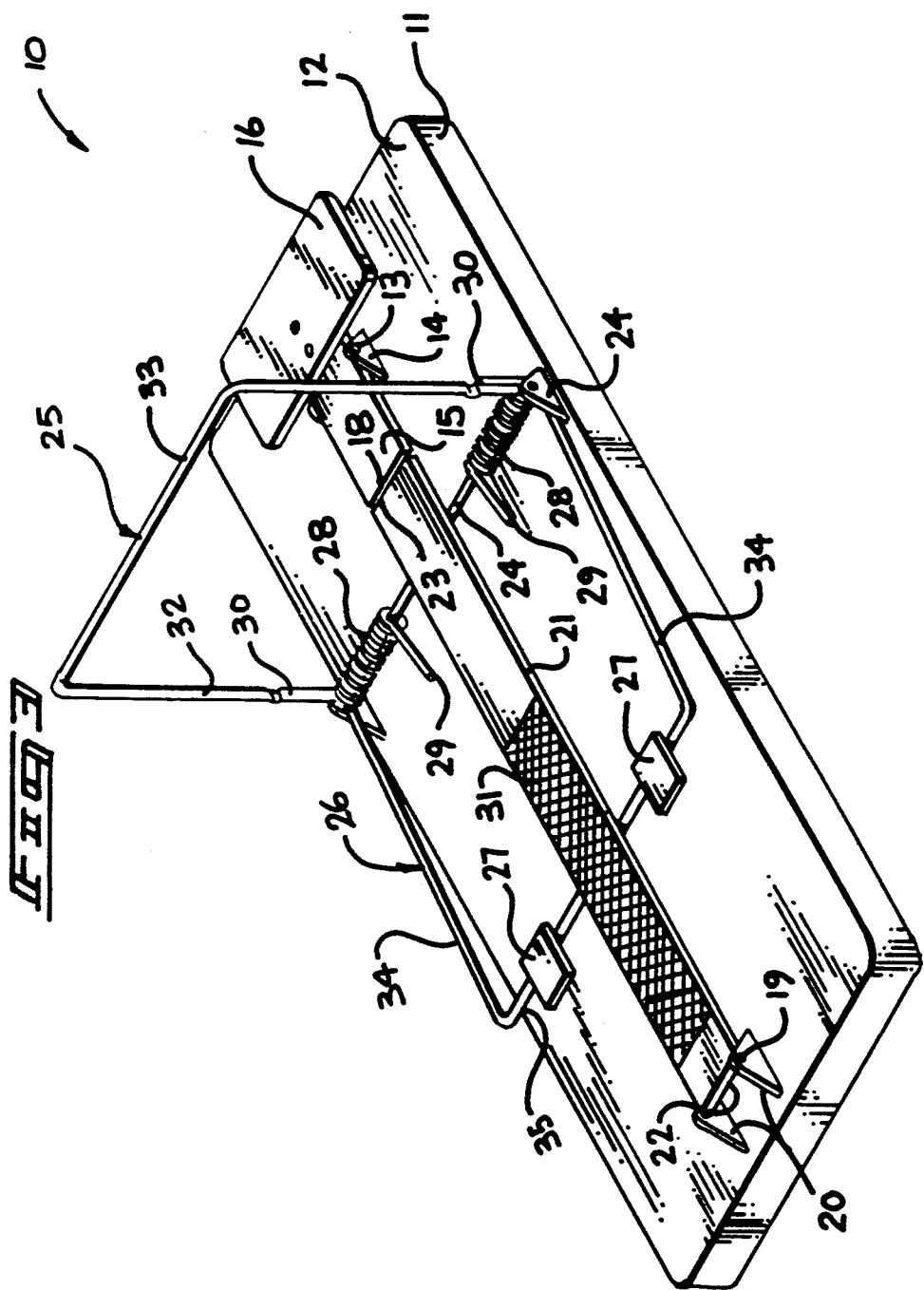

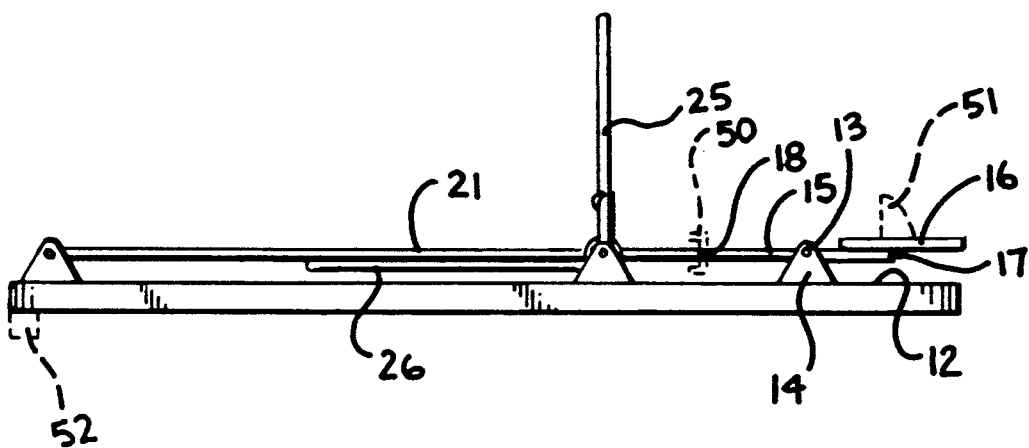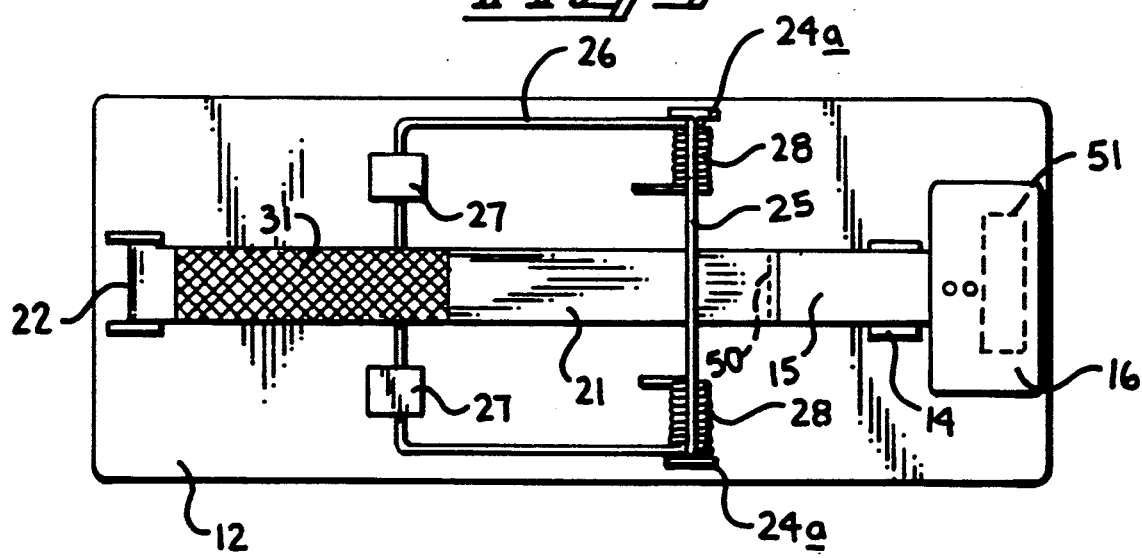

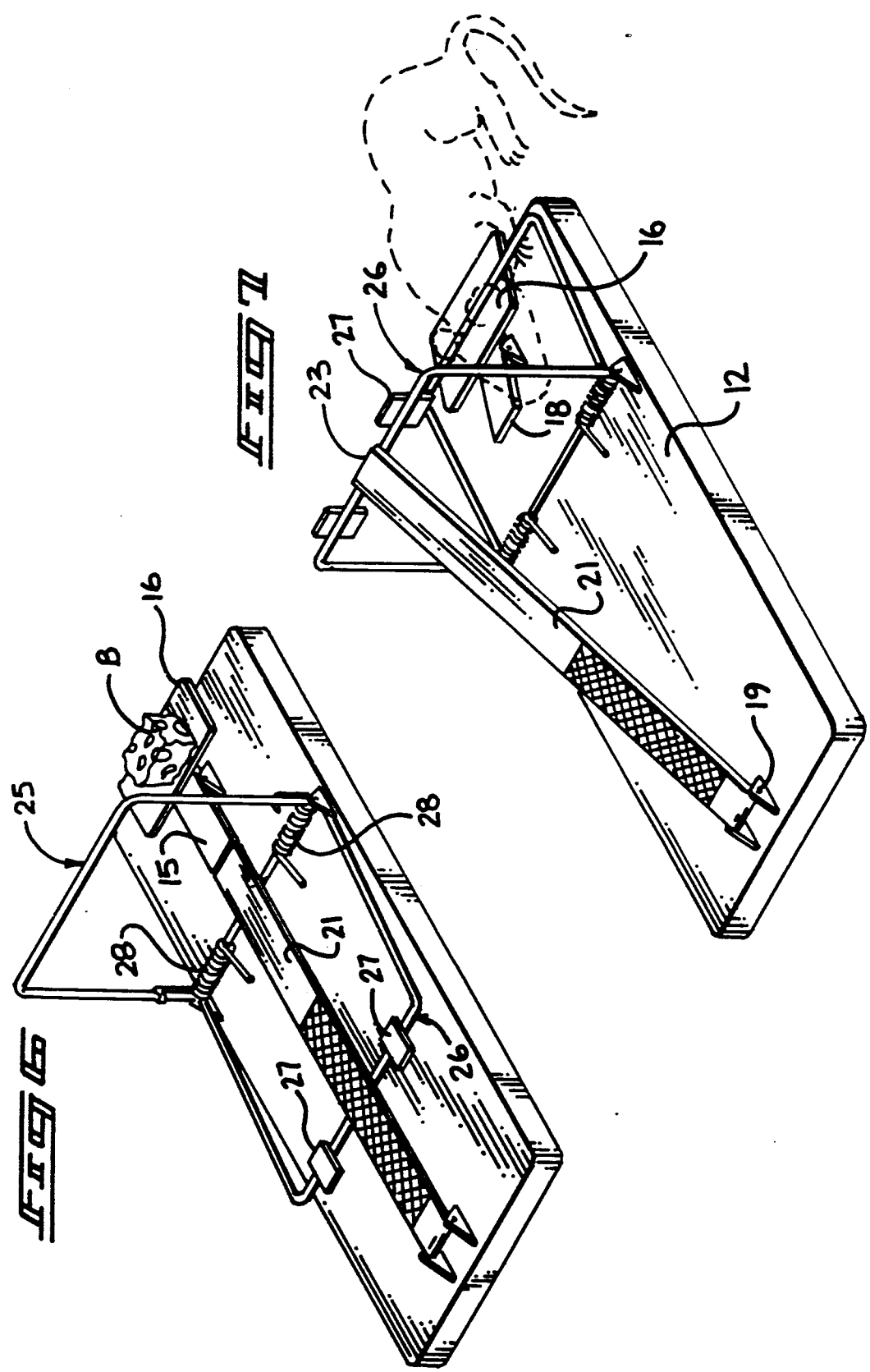

5,142,813

MOUSE TRAP APPARATUS

BACKGROUND OF THE INVENTION

1. Field of the Invention

The field of invention relates to mouse trap apparatus, and more particularly pertains to a new and improved mouse trap apparatus wherein the same utilizes abutting plates as a trigger mechanism for trapping a rodent and the like thereon.

2. Description of the Prior Art

Various mouse trap apparatus has been utilized in the prior art to trap and kill rodents of various sizes thereon. The instant invention sets forth an organization wherein the same eliminates need for individuals to contact or come in proximity with a rodent secured by the trap structure. Examples of the prior art include U.S. Pat. No. 605,890 to Merritt wherein the apparatus effects projection of a spike into a rodent upon an animal mounting a lever, with a plate at the forward end of the level pivoting the spike upwardly into the rodent.

U.S. Pat. No. 4,578,893 to Wickenberg sets forth a generally "V" shaped bale, with an over-centering mechanism effecting a snap action onto a vermin in the trap.

U.S. Pat. No. 1,027,974 to Barker sets forth a trap member wherein a lever jaw structure is utilized to secure a rodent.

As such, it may be appreciated that there continues to be a need for a new and improved mouse trap apparatus as set forth by the instant invention which addresses both the problems of ease of use as well as effectiveness in utilizing a plurality of "U" shaped loops integrally mounted relative to one another to permit trapping and killing of a rodent while simultaneously permitting an individual to avoid contact with a rodent for release from a trap and in this respect, the present invention substantially fulfills this need.

SUMMARY OF THE INVENTION

In view of the foregoing disadvantages inherent in the known types of mouse trap apparatus now present in the prior art, the present invention provides a mouse trap apparatus wherein the same is arranged to utilize a trigger mechanism formed by abutting longitudinally aligned plates that are displaced relative to one another to permit release of an unbiased loop to engage a respective rodent relative to the trap. As such, the general purpose of the present invention, which will be described subsequently in greater detail, is to provide a new and improved mouse trap apparatus which has all the advantages of the prior art mouse trap apparatus and none of the disadvantages.

To attain this, the present invention provides an apparatus including a support plate, with the support plate including a first pivot axle mounting a first plate thereon. The first plate includes a first end mounting a support plate, the second end is positioned in abutment with a second plate in a longitudinally aligned orientation relative to the second plate when the second plate and first plate are in a first position. When in the first position, the second plate is positioned over a second loop, with a first loop oriented orthogonally relative to the top surface of the support plate. Upon a rodent disrupting the bait support plate, the first plate is displaced relative to the second plate releasing the first loop for a step action acceleration onto the bait plate floor for impact therewith to trap or kill the rodent thereon.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved mouse trap apparatus which has all the advantages of the prior art mouse trap apparatus and none of the disadvantages.

It is another object of the present invention to provide a new and improved mouse trap apparatus which may be easily and efficiently manufactured and marketed.

It is a further object of the present invention to provide a new and improved mouse trap apparatus which is of a durable and reliable construction.

An even further object of the present invention is to provide a new and improved mouse trap apparatus which is susceptible of a low cost of manufacture with regard to both materials and labor, and which accordingly is then susceptible of low prices of sale to the consuming public, thereby making such mouse trap apparatus economically available to the buying public.

Still yet another object of the present invention is to provide a new and improved mouse trap apparatus which provides in the apparatuses and methods of the prior art some of the advantages thereof, while simultaneously overcoming some of the disadvantages normally associated therewith.

Still another object of the present invention is to provide a new and improved mouse trap apparatus wherein the same is arranged for capturing and killing a mouse, with a further bale member providing a trigger and subsequent release mechanism for releasing the mouse from the trap.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there as illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of a prior art mouse trap apparatus.

FIG. 2 is an orthographic side view of the prior art mouse trap apparatus of FIG. 1 in an operative configuration.

FIG. 3 is an insometric illustration of the instant invention.

FIG. 4 is an orthograpic side view of the instant invention.

FIG. 5 is an orthographic top view of the instant invention.

FIG. 6 is an isometric illustration of the invention.

FIG. 7 is an isometric illustration of the invention in an operative configuration trapping a rodent thereon.

DESCRIPTION OF THE PREFERRED EMBODIMENT

With reference now to the drawings, and in particular to FIGS. 3 to 7 thereof, a new and improved mouse trap apparatus embodying the principles and concepts of the present invention and generally designated by the reference numeral 10 will be described.

FIGS. 1 and 2 illustrates a prior art mouse trap apparatus, as exemplified in U.S. Pat. No. 4,578,893, wherein a trip lever 2 is sprung from a raised position to a lowered position to engage an associated rodent.

More specifically, the mouse trap apparatus 10 of the instant invention essentially comprises a support plate 11, including a planar top wall 12. Mounted at the top wall in a parallel relationship is a first pivot axle 13 pivotally mounted between first ears 14 that are in turn orthogonally mounted to the support plate top wall. A first plate 15 includes a first plate first end 17 and a first plate second end 18, wherein the first plate is orthogonally oriented relative to the first pivot axle 13 and is pivotally mounted intermediate its first and second ends 17 and 18 to the first pivot axle 13, and includes a first plate bait support plate 16 mounted to the first end of the first plate 15 between the first pivot axle 13 and the first end 17. A second pivot axle 19 arranged parallel to and spaced from the first pivot axle 13 is positioned adjacent an opposed end of the support plate 11 mounted to the top wall 12 in a parallel relationship to a plurality of second pivot axle ears 20. The second pivot axle pivotally mounts a second plate 21 thereon at a rear or second plate first end 22. A second plate second end 23 is in contiguous abutment with the first plate second end 18 when the first plate and second plate are in a first aligned position relative to one another.

A third axle 24 mounted to third axle ears 24a is arranged medially of and parallel relative to the first and second pivot axles 13 and 19 respectively. The third axle extends laterally beyond the first and second plates, and includes a first "U" shaped loop 25 fixedly and orthogonally mounted to a second "U" shaped loop 26. The first and second "U" shaped loops 25 and 26 are pivotally mounted to the third axle 24. The second "U" shaped loops 26 includes a plurality of finger pads 27 fixedly mounted to a base leg 35 of the second loop, wherein the second base leg 35 is orthogonally mounted to upper terminal ends of second side legs 34. The first "U" shaped loop includes first side legs 32 orthogonally mounting a first base leg 33 at remote terminal ends of the first side legs 32 spaced from the third axle 24. Spring members 28 each include a spring member first end 29 and a spring member second end 30. The spring members 28 are wound about the second axle at opposed ends thereof on opposite sides of the second plate 21, wherein the first end 29 is biased against the support plate top wall 12 and the second end 30 is mounted to a respective first loop base leg 33 to normally bias the first "U" shaped loop into communication with the bait support plate 16. It should be noted that the second plate 21 includes a second plate friction surface 31 extending between the second plate's first end 22 and the second plate's second end 23 to accommodate manual pressure thereon in a non-slip relationship.

The geometry of the organization requires that the first plate 15 is defined by a first length between the first pivot axle 13 and the first plate second end 18 that is less than the spacing from the first pivot axle 13 to the third axle 24. The second plate includes a predetermined length from the second plate first end 22 to the second end 23 that is greater than a spacing from the first end 22 to the third axle 24, wherein the first plate second end and the second plate second end are in contiguous abutment in a first position. Further, it should be noted that the second "U" shaped loop 26 is positioned between the first plate 21 and the support plate top wall 12. Further, the first loop and its associated first base leg 33 defines a spacing from the third axle 24 to the first base leg 33 that is equal to or greater than a spacing from the third axle 24 to the bait support plate 16 to ensure contact with the aforenoted vermin or rodent.

Reference to FIG. 6 illustrates the trap structure in a second position, wherein the first plate 15 and the second plate 21 are displaced relative to one another, with the first "U" shaped loop 25 in communication with the bait plate 16 and the second loop 26 in a second raised position oriented generally orthogonally to the top wall 12, but remaining in communication with a bottom surface of the second plate 21.

It should be further noted that the mouse trap apparatus of the invention may further include additional refinements as exemplified in FIGS. 4 and 5. In this organization, the first plate 15 includes a "C" shaped socket member extending coextensively of the forward end or second end 18 of the first plate member 15 to receive the second plate therewithin to permit ease of mounting of the second plate within the first plate for setting of the mouse trap. In this manner, an individual may utilize a one-handed manner of setting the trap, as opposed to utilizing two hands as in prior art structures. Further, should two hands be necessary to for use, an abutment lip 52 extends coextensively with a bottom surface of the support plate 11 below the second pivot axle 19 to enhance manual grasping and leveraging of the mouse trap structure in a setting procedures. Further, to avoid an aspect typical with rodents and the like, the support plate 16 includes a housing 51 to receive bait therewithin to require a rodent to position itself upon the top wall 12 for accessibility to the "U" shaped loop 26 in its accelerated descent to the top wall 12 when the trap is sprung. Access to the cup 51 is from the forward end of the first plate 15 to require the rodents positioning below the "U" shaped loop 26.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials shape, form, function and manner of operation, assembly and use, are deemed readily apparent and obvious to one skilled in the art, and alll equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mouse trap apparatus comprising, a support plate, the support plate including a planar top wall, the planar top wall mounting a first pivot axle in a parallel relationship relative to the top wall, with the first pivot axle mounting a first plate intermediate a first plate first end and a first plate second end, when the plate is orthogonally oriented relative to the first pivot axle, and a second pivot axle oriented parallel to the first pivot axle and a support plate planar top wall, wherein the second pivot axle pivotally mounts a second plate at a first end of the second plate, and wherein the second plate includes a second plate second end, wherein the second plate second end is in contiguous abutment with the first plate second end in a first position and displaced relative to the first plate second end in a second position, and a third pivot axle mounted between the first pivot axle and the second pivot axle adjacent the planar top wall and parallel thereto and oriented parallel to the first pivot axle and the second pivot axle, wherein the third pivot axle pivotally mounts a first U-shaped loop and a second U-shaped loop, the first U-shaped loop is fixedly and orthogonally mounted relative to the second U-shaped loop at an intersection, and the intersection is pivotally mounted relative to the third axle, and the second U-shaped loop is positioned below the second plate, and the first U-shaped loop is oriented orthogonally relative to the support plate top wall in a first position and in contact with the first plate in a second position, and the first plate includes a bait support plate mounted to the first plate second end, and the second U-shaped loop includes a second side leg orthogonally mounted relative to the third pivot axle, and a base leg spaced parallel relative to the third pivot axle, wherein the second base leg defines a second base leg spacing between the third pivot axle and the second base leg equal to or greater than a bait plate spacing defined between the bait plate and the third pivot axle, and at least spring member means mounted about the third pivot axle for biasing the first U-shaped loop into engagement with the bait support plate, and the second U-shaped loop includes second side legs fixedly mounted to the first side legs of the first U-shaped loop, and wherein the second side legs include a second base leg, the second base leg is positioned in contiguous communication with a bottom surface of the second plate, and the second base leg includes a plurality of finger pads fixedly mounted to the second U-shaped loop for providing enhanced surface engagement with the second U-shaped loop for displacement of the second U-shaped loop in the first position, wherein the first plate is in alignment with the second plate, and the first plate includes a first plate length between the first pivot axle and the first plate second end less than a spacing between the first pivot axle and the third pivot axle, and wherein the second plate defines a second plate length between the second plate first end and the second plate second end greater than a predetermined spacing between the second plate first end and the third pivot axle.

* * * * *